US012621701B2

(12) United States Patent
Kawai et al.

(10) Patent No.: US 12,621,701 B2
(45) Date of Patent: May 5, 2026

(54) WIRELESS COMMUNICATION DATA TRANSMISSION DEVICE, DATA TRANSMISSION METHOD, AND STORAGE MEDIUM STORING DATA TRANSMISSION PROGRAM

(71) Applicant: DENSO CORPORATION, Kariya (JP)

(72) Inventors: Shigeki Kawai, Kariya (JP); Tsuneo Nakata, Kariya (JP)

(73) Assignee: DENSO CORPORATION, Kariya-city (JP)

( * ) Notice: Subject to any disclaimer, the term of this patent is extended or adjusted under 35 U.S.C. 154(b) by 424 days.

(21) Appl. No.: 18/187,581

(22) Filed: Mar. 21, 2023

(65) Prior Publication Data

US 2023/0232271 A1 Jul. 20, 2023

Related U.S. Application Data

(63) Continuation of application No. PCT/JP2021/024395, filed on Jun. 28, 2021.

(30) Foreign Application Priority Data

Sep. 25, 2020 (JP) ................................. 2020-161477

(51) Int. Cl.
*H04W 28/02* (2009.01)
*H04W 72/0446* (2023.01)
(52) U.S. Cl.
CPC ... *H04W 28/0226* (2013.01); *H04W 28/0236* (2013.01); *H04W 72/0446* (2013.01)

(58) Field of Classification Search
CPC ......... H04W 28/0226; H04W 28/0236; H04W 72/0446
See application file for complete search history.

(56) References Cited

U.S. PATENT DOCUMENTS

| | | | |
|---|---|---|---|
| 2006/0140146 A1* | 6/2006 | Funk ................... | H04W 72/569 370/466 |
| 2013/0051359 A1* | 2/2013 | Skarby ................. | H04W 72/54 370/330 |

(Continued)

FOREIGN PATENT DOCUMENTS

| | | |
|---|---|---|
| JP | 2005005937 A | 1/2005 |
| JP | 2019140563 A | 8/2019 |

(Continued)

*Primary Examiner* — Michael Thier
*Assistant Examiner* — Nevena Zecevic Sandhu
(74) *Attorney, Agent, or Firm* — Harness, Dickey & Pierce, P.L.C.

(57) ABSTRACT

A data transmission device includes a wireless communication unit that wirelessly communicates with an external communication device, a travel route information acquirer that acquires a future travel route of a moving object, a travel route, a propagation environment information acquirer that acquires propagation environment information of a radio wave propagation path used in wireless communication, a speed information acquisition unit that acquires the moving speed of a moving object, and a converter that converts a relationship between the travel route and propagation environment information into a plurality of data slots each defined by the communication speed per unit time; a transmission instructor that instructs the wireless communication unit to transmit the data allocated to the data slot.

8 Claims, 8 Drawing Sheets

(56) References Cited

U.S. PATENT DOCUMENTS

| 2019/0253948 A1 | 8/2019 | Nagura et al. | |
| 2019/0356569 A1 | 11/2019 | Kawauchi et al. | |
| 2020/0014486 A1* | 1/2020 | Harrang | H04B 17/309 |
| 2021/0070317 A1 | 3/2021 | Hitotsumatsu et al. | |
| 2022/0013007 A1* | 1/2022 | Balasubramanian | H04W 4/40 |

FOREIGN PATENT DOCUMENTS

| JP | 2019200658 A | 11/2019 |
| JP | 2019203823 A | 11/2019 |

* cited by examiner (a)

(b)

(c)

1

WIRELESS COMMUNICATION DATA TRANSMISSION DEVICE, DATA TRANSMISSION METHOD, AND STORAGE MEDIUM STORING DATA TRANSMISSION PROGRAM

CROSS REFERENCE TO RELATED APPLICATION

This application is a continuation application of International Patent Application No. PCT/JP2021/024395 filed on Jun. 28, 2021, which designated the U.S. and claims the benefit of priority from Japanese Patent Application No. 2020-161477 filed on Sep. 25, 2020. The entire disclosure of all of the above application is incorporated herein by reference.

TECHNICAL FIELD

The present application relates to a data transmission device or the like that transmits data based on a communication plan for efficient data transmission, and is mainly a data transmission device or the like mounted on a moving object, or a data transmission device and the like realized by a server device and the like that performs communication directly or indirectly with a moving object.

BACKGROUND

With the spread of wireless communication, opportunities to communicate using wireless communication are increasing in various places. In particular, in moving objects such as automobiles, attention is being paid to techniques for performing driving assistance and automatic driving control using high-capacity cellular communication, V2X such as vehicle-to-vehicle communication and road-to-vehicle communication. As a result, a vehicle is equipped with a communication function, and so-called connectivity of the vehicle has been promoted. Here, in wireless communication, it is known that radio waves interfere with each other, causing the strength and weakness of the transmission level and reception level of radio waves depending on the location, and such a phenomenon is generally called fading. Since moving objects such as automobiles are assumed to be moving thereby causing fluctuation of the communication quality along with the move of the moving objects, a countermeasure for the fading may be established if communication quality at a certain location is known in advance.

For example, there has been known a communication resource map that indicates the correspondence relationship between a point and an amount of communication resource that is estimated to be available for communication at that point. Further, prediction of communication quality along a communication path using information acquired by statistically processing the relationship between position and communication speed has been also known.

SUMMARY

A data transmission device according to one aspect of the present disclosure is mounted in a moving object, including:

a wireless communication unit that performs wireless communication with an external communication device;

a data storage unit that stores data to be transmitted from the wireless communication unit;

a travel route information acquisition unit that acquires a future travel route of the moving object;

a propagation environment information acquisition unit that acquires propagation environment information of a radio wave propagation path used in the wireless communication on the travel route;

a speed information acquisition unit that acquires a moving speed of the moving object;

a converter that converts a relationship between the travel route and the propagation environment information into a plurality of data slots each defined by a communication speed per unit time based on the moving speed;

an allocator that allocates the data to at least one of the data slots in an order from a data slot among the at least one data slots having a highest communication speed; and a transmission instructor that instructs the wireless communication unit to transmit the data allocated to a data slot among the at least one of the data slots that corresponds to a current time.

DESCRIPTION OF EMBODIMENTS

Figure 1:
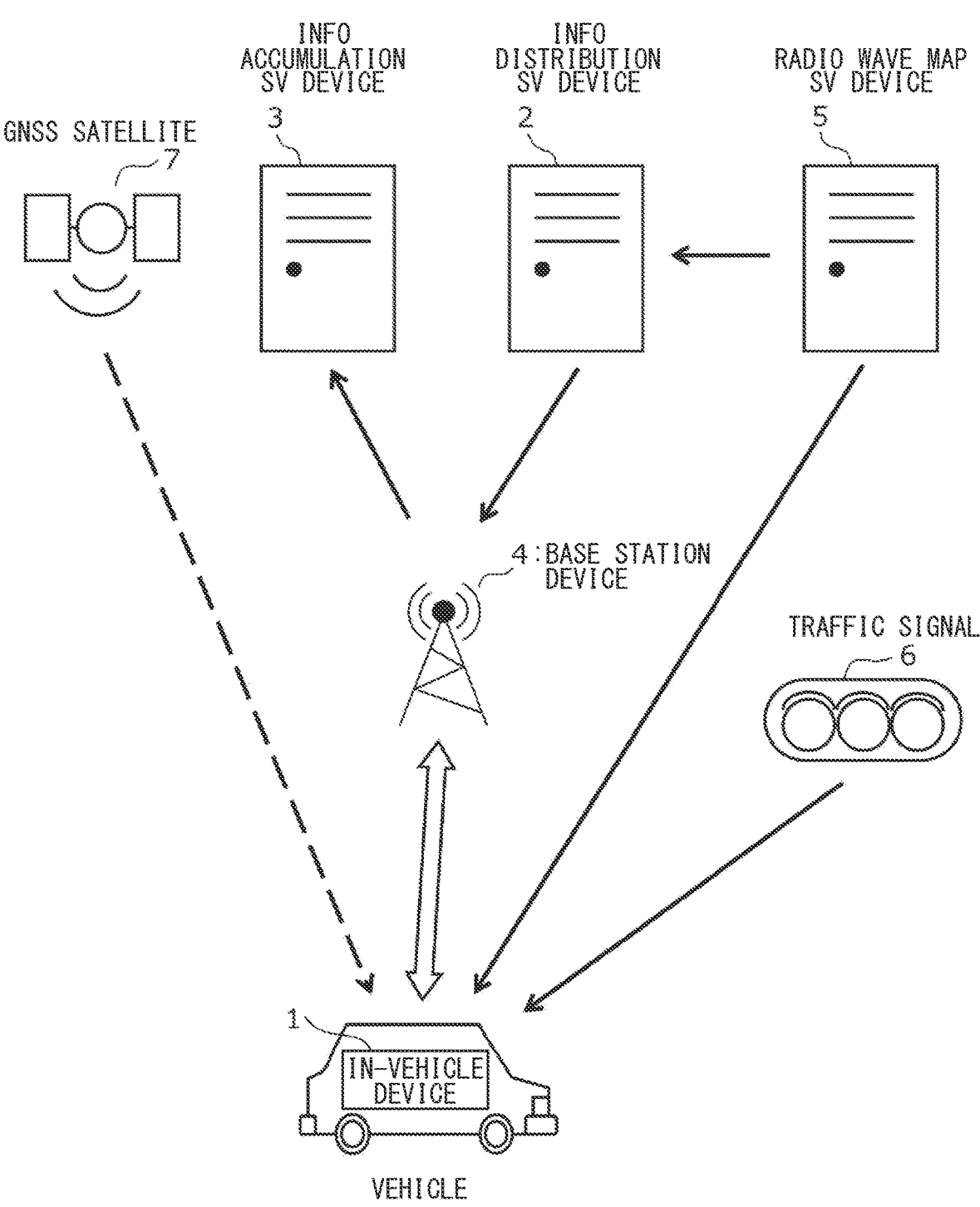
FIG. 1 is a diagram showing an overall configuration of an embodiment of the present disclosure.

Next, a relevant technology will be described only for understanding the following embodiments. Here, the inventors of the present disclosure have discovered the followings. By using a radio wave map showing points on the map and the state or the estimation result of the radio wave propagation path at those points, the state of the radio wave propagation path along the future movement route can be known in advance. Therefore, a future communication plan can be made based on the movement route and the state of the radio wave propagation path. However, when performing communication, it is necessary to constantly obtain the current position of the vehicle and compare it with the radio wave map, which increases the amount of calculation. Further, in making a communication plan, for example, if a time limit is set for data to be transmitted and received, time management is required in order to complete the transmission and reception within the time limit. Therefore, it is not possible to make a communication plan based only on the radio wave map and the current position.

It is one objective of the present disclosure to efficiently transmit and receive data based on a communication plan. More specifically, the object is to efficiently transmit and receive data by incorporating time elements.

A data transmission device according to one aspect of the present disclosure is mounted in a moving object, including:

a wireless communication unit that performs wireless communication with an external communication device;

a data storage unit that stores data to be transmitted from the wireless communication unit;

a travel route information acquisition unit that acquires a future travel route of the moving object;

a propagation environment information acquisition unit that acquires propagation environment information of a radio wave propagation path used in the wireless communication on the travel route;

a speed information acquisition unit that acquires a moving speed of the moving object;

a converter that converts a relationship between the travel route and the propagation environment information into a plurality of data slots each defined by a communication speed per unit time based on the moving speed;

an allocator that allocates the data to at least one of the data slots in an order from a data slot among the at least one data slots having a highest communication speed; and a transmission instructor that instructs the wireless communication unit to transmit the data allocated to a data slot among the at least one of the data slots that corresponds to a current time.

A data transmission device according to another aspect of the present disclosure is configured to transmit data to a moving object, which includes:

a transmission unit that transmits the data to an external communication device that wirelessly communicates with the moving object;

a data storage unit that stores the data transmitted from the transmission unit;

a travel route information acquirer that acquires a future travel route of the moving object;

a propagation environment information acquirer that acquires propagation environment information of a radio wave propagation path used in the wireless communication on the travel route;

a receiver unit that receives a moving speed of the moving object;

a converter that converts a relationship between the travel route and the propagation environment information into a plurality of data slots each defined by a communication speed per unit time based on the moving speed;

an allocator that allocates the data to at least one of the data slots in order from a data slot among the at least one of the data slots having a highest communication speed; and a transmission instructor that instructs the transmission unit to transmit the data allocated to a data slot among the at least one of the data slots that corresponds to a current time.

A data transmission method according to yet another aspect of the present disclosure is executed by a data transmission device mounted in a moving object and having a wireless communication unit that performs wireless communication with an external communication device, which includes steps of:

acquiring a future travel route of the moving object;

acquiring propagation environment information of a radio wave propagation path used in the wireless communication on the travel route;

obtaining a moving speed of the moving object;

converting a relationship between the travel route and the propagation environment information into a plurality of data slots each defined by a communication speed per unit time based on the moving speed;

allocating the data to at least one of the data slots in an order from a data slot among the data slots having a highest communication speed; and instructing the wireless communication unit to transmit the data allocated to a data slot among the data slots that corresponds to the current time.

A data transmission method according to still yet another aspect of the present disclosure is executed by a data transmission device having a transmission unit that transmits data to an external communication device that wirelessly communicates with a moving object, which includes steps of:

acquiring a future travel route of the moving object;

acquiring propagation environment information of a radio wave propagation path used in the wireless communication on the travel route;

receiving a moving speed of the moving object;

1converting a relationship between the travel route and the propagation environment information into a plurality of data slots each defined by a communication speed per unit time based on the moving speed;

allocating the data to at least one of the data slots in order from a data slot among the at least one of the data slots having a highest communication speed; and instructing the transmission unit to transmit the data allocated to a data slot among the data slots that corresponds to the current time.

A non-transitory, computer readable, tangible storage medium storing data transmission program according to still yet another aspect of the present disclosure is executable by a data transmission device mounted in a moving object and having a wireless communication unit that performs wireless communication with an external communication device, which includes steps of:

acquiring a future travel route of the moving object;

acquiring propagation environment information of a radio wave propagation path used in the wireless communication on the travel route;

receiving a moving speed of the moving object;

converting a relationship between the travel route and the propagation environment information into a plurality of data slots each defined by a communication speed per unit time based on the moving speed;

allocating the data to at least one of the data slots in order from a data slot among the data slots having a highest communication speed; and instructing the transmission unit to transmit the data allocated to a data slot among the at least one of the data slots that corresponds to the current time.

A non-transitory, computer readable, tangible storage medium storing a data transmission program according to still yet another aspect of the present disclosure is executable by a data transmission device having a transmission unit that transmits data to an external communication device that wirelessly communicates with a moving object, which includes steps of:

acquiring a future travel route of the moving object;

acquiring propagation environment information of a radio wave propagation path used in the wireless communication on the travel route;

receiving a moving speed of the moving object;

converting a relationship between the travel route and the propagation environment information into a plurality of data slots each defined by a communication speed per unit time based on the moving speed;

allocating the data to at least one of the data slots in order from a data slot among the at least one of the data slots having a highest communication speed; and instructing the transmission unit to transmit the data allocated to a data slot among the at least one of the data slots that corresponds to the current time.

The following describes embodiments of the present disclosure with reference to the drawings.

The present invention referred hereinafter indicates an invention described in the claims, and is not limited to the following embodiments. Further, at least words within double quotations mean words and phrases described in claims, and are not limited to the following embodiments.

Configurations and methods descried in dependent claims should be interpreted as arbitrary configurations and arbitrary methods within descriptions in independent claim(s). Configurations and methods of the following embodiments corresponding to configurations and methods recited in dependent claims, and configurations and methods described only in the following embodiments without recitations in claims should be interpreted as arbitrary configurations and arbitrary methods in the present disclosure. In case that the scope of claims is broader than descriptions of the embodiments, configurations and methods described in the following embodiments are just examples of configurations and methods of the present disclosure, which should be interpreted as arbitrary configurations and arbitrary methods in the present disclosure. In any cases, essential configurations and methods of the present invention should be interpreted based on independent claims.

Any effects described in embodiments are effects acquired by a configuration of an embodiment as an example of the present disclosure, and are not necessarily effects of the present disclosure.

When there are multiple embodiments, a configuration disclosed in each embodiment is not limited to each embodiment, but can be combined across embodiments. For example, a configuration disclosed in one embodiment may be combined with other embodiments. Configurations disclosed the respective multiple embodiments may be collected and combined.

The problem described in the present disclosure is not a publicly-known problem, but person including the inventor has independently found out the problem, which is a fact that affirms the inventive step of the invention together with the configuration and method of the present disclosure.

1. Overall Configuration Example of Each of the Embodiments

Devices related to each of the embodiments, their inter-relationships, and an example of the overall configuration of each of the embodiments are described first with reference to FIG. 1.

An in-vehicle device 1 mounted on a vehicle corresponds to a data transmission device 100 of the first embodiment, and transmits various data to an information accumulation server device 3 via a base station device 4.

An information distribution server device 2 corresponds to a data transmission device 200 of the second embodiment, and transmits various data to the in-vehicle device 1 via the base station device 4.

The base station device 4 (corresponding to an "external communication device") is a device that performs wireless communication with the in-vehicle device 1.

As for the wireless communication method between the base station device 4 and the in-vehicle device 1, IEEE802.11 (WiFi (registered trademark)), IEEE802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, 5G, etc. can be used, for example. Alternatively, Dedicated Short Range Communication (DSRC) may also be used.

The communication method between the information distribution server device 2 and the base station device 4, and the communication method between the information storage server device 3 and the base station device 4, may be any of (i) a wired communication method, (ii) a wireless communication method, or (iii) both a wired communication method and a wireless communication method. For example, in case that the wireless communication method between the base station device 4 and the in-vehicle device 1 is 4G, the base station device 4 corresponds to an eNB, which means, normally, communication beyond eNB is a wired communication provided by a communication service provider. However, when the wireless communication method between the base station device 4 and the in-vehicle device 1 is WiFi, the base station device 4 corresponds to an access point (AP), thereby any one of wired and wireless communication methods can be used for connection from the access point to a router.

A radio wave map server device 5 stores a radio wave map, and transmits the radio wave map to a requested destination. For example, the radio wave map server device 5 transmits the radio wave map to the in-vehicle device 1 and the information distribution server device 2 in response to a radio wave map request or periodically. A communication network used for transmitting the radio wave map may be a wired communication method or a wireless communication method. In addition, in FIG. 1, when a radio wave map is transmitted from the radio wave map server device 5 to the in-vehicle device 1, a communication network that does not pass through the base station device 4 may be used.

Here, the radio wave map refers to a set or a collection of states of a radio wave propagation path at a specific position or a set of estimation results thereof, which may be, for example, a mapping of RSSI and/or transmission bit rate for each of grid points on a map.

In FIG. 1, the radio wave map server device 5 saves and utilizes the states of the radio wave propagation path or the estimation results thereof provided by the wireless communication method of the base station device 4. Since the radio wave propagation path includes an uplink and a downlink, the radio wave map server device 4 preferably stores radio wave maps for both.

The radio wave map for the downlink only needs to link information for evaluating a reception status of the downlink with position information. For example, a reception radio wave map is generated by measuring and collecting a reception strength when a probe vehicle receives a reference signal transmitted by the base station device 4. For example, reference signal RSSI, RSRP, or RSRQ may correspond to the above. The radio wave map for the uplink only needs to link information for evaluating the reception status of the uplink with the position information. For example, the reception radio wave map is generated by measuring the reception strength of the reference signal transmitted by the probe vehicle, and by collecting the received strength together with the position information of the probe vehicle. For example, reference signal RSSI (Received Signal Strength Indication), RSRP (Reference Signal Received Power), or RSRQ (Reference Signal Received Quality) may correspond to the above. Alternatively, a transmission radio wave map is generated by collecting (a) an average transmission bit rate (bit/s) when the probe vehicle transmits data together with (b) the position information of the probe vehicle.

In principle, the uplink radio wave map is used for evaluation of the uplink radio wave propagation path, and the downlink radio wave map is used for evaluation of the downlink radio wave propagation path. In the first embodiment, the in-vehicle device 1 functions as the data transmission device 100 and uses the uplink, thereby the radio wave map for the uplink is used. Further, in the second embodiment, the information distribution server device 2 functions as the data transmission device 200 and uses the downlink, thereby the radio wave map for the downlink is used. However, if it is possible to evaluate that the uplink and downlink propagation environments are the same, the downlink radio wave map may be used for uplink evaluation, and the uplink radio wave map may be used for downlink evaluation. For example, there is a TDD (Time Division Duplex) mode in which the uplink and downlink use the same frequency band. Another example is a case where the same change in propagation environment is expected in uplink and downlink due to obstructions such as buildings or the like.

A traffic signal 6 transmits a signal type, which is information on s current signal lamp color, and a remaining time until a signal type is switched. Signal types include at least a stop signal that means stop and a progress signal that means progress. In many countries such as Japan and the United States, the former is a red light and the latter is a blue light. For example, if the red light is currently on and the remaining time is 30 seconds, the red light will change to the blue light after 30 seconds.

The traffic signal 6 transmits the signal type and the remaining time using road-to-vehicle communication, and the in-vehicle device 1 receives them. However, the traffic signal 6 may transmit these pieces of information by a method other than road-to-vehicle communication. For example, the information may be transmitted from the traffic signal 6 via the wired communication network, and from the base station device 4. In such case, the vehicle-mounted device 1 receives these pieces of information from the base station device 4 using the wireless communication method of the base station device 4.

GNSS satellites 7 are satellites that transmit positioning signals, and examples thereof include GPS and differential GPS. The in-vehicle device 1 receives the positioning signal and uses a gyro or radar sensor together as necessary to acquire current position information indicating a current position of the vehicle.

Although the information distribution server device 2, the information storage server device 3, and the radio wave map server device 5 are separate devices, at least two of these functions may be realized by the same server device. In FIG.

1, it is assumed that the information distribution server device 2 does not move. However, the information distribution server device 2 may be disposed in a vehicle different from the one having the in-vehicle device 1, and data may be transmitted to the in-vehicle device 1 via the base station device 4. The above configuration is explained in a modification of the second embodiment.

2. First Embodiment (1) Configuration of the Data Transmission Device 100

Figure 2:
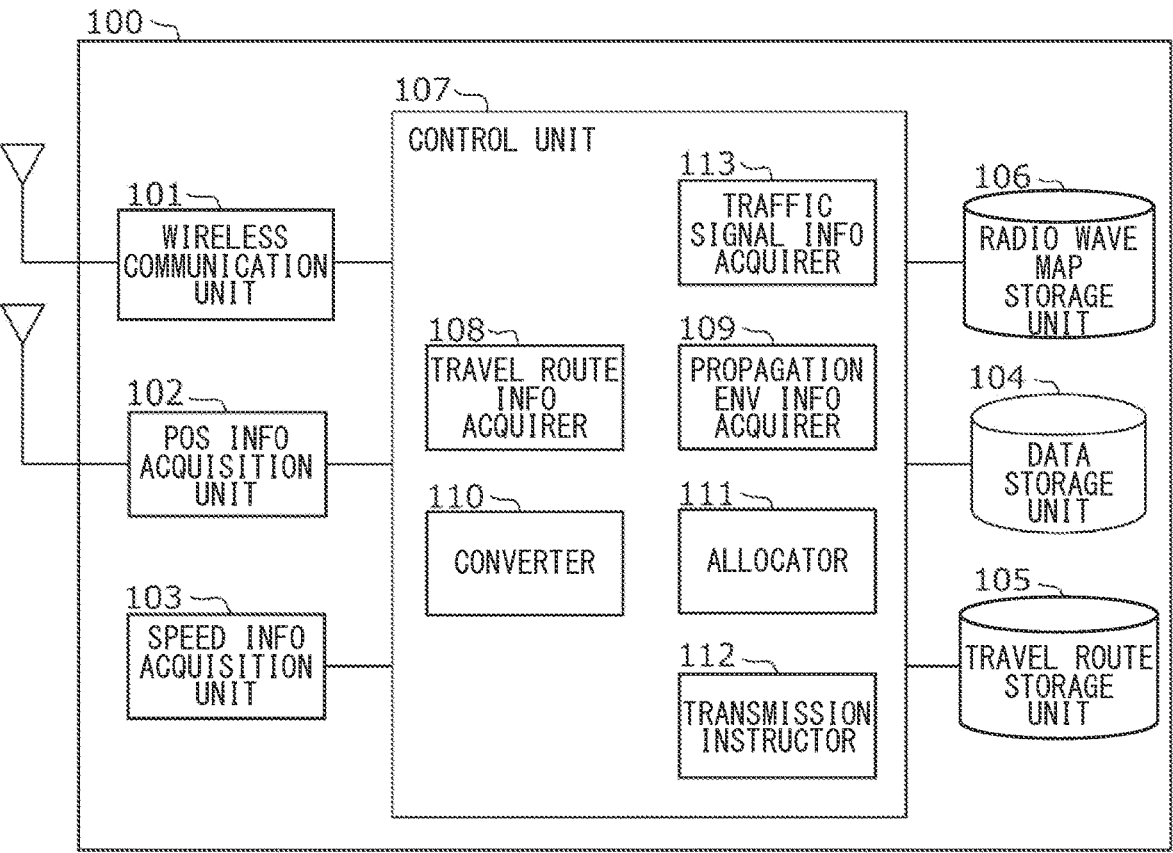
FIG. 2 is a block diagram showing a configuration example of a data transmission device according to a first embodiment of the present disclosure.

The configuration of the data transmission device 100 according to the first embodiment is described with reference to FIG. 2. In the present embodiment, the in-vehicle device 1 in FIG. 1 corresponds to the data transmission device 100.

The data transmission device 100 is a device "mounted" in a vehicle, which is a "moving object". The "moving object" refers to an object that is mobile or movable, and a travel speed of the moving object is arbitrary. Naturally, there may be a case where the moving object is stopped. Examples of the moving object include, but are not limited to, automobiles, motorcycles, bicycles, pedestrians, ships, aircrafts, and objects mounted thereon. In addition, the term "mounted" includes not only the case of being directly fixed to the moving object, but also the case of not being fixed to the moving object but moving together with the moving object. For example, there may be a case where a person riding on the moving object carries the object, or a case where the object is mounted in a load placed on the moving object.

The data transmission device 100 includes a wireless communication unit 101, a position information acquisition unit 102, a speed information acquisition unit 103, a data storage unit 104, a travel route storage unit 105, a radio wave map storage unit 106 and a control unit 107. Also, the control unit 107 implements a travel route information acquirer 108, a propagation environment information acquirer 109, a converter 110, an allocator 111, a transmission instructor 112, and a traffic signal information acquirer 113.

The data transmission device 100 can be configured with a general-purpose CPU (Central Processing Unit), volatile memory such as RAM, nonvolatile memory such as ROM, flash memory, or hard disk, various interfaces, and an internal bus connecting them. Software is executed on the hardware described above, and thus a function of each of the functional blocks illustrated in FIG. 2 can be realized. Of course, the data transmission device 100 may be realized by dedicated hardware such as LSI.

In the present embodiment, the data transmission device 100 is assumed to be in the form of an electronic control unit (ECU) which is a semi-finished product, but the data transmission device 100 is not limited to be in such a form. For example, a form of a component may be a semiconductor circuit or a semiconductor module, and a form of a finished product may be a personal computer (PC), a smartphone, a cellular phone, or a navigation system. Note that the data transmission device 100 may be configured with a plurality of ECUs instead of a single ECU. For example, a communication ECU may perform communication with the outside.

The wireless communication unit 101 performs "wireless communication" with the base station device 4, which is an external communication device. Various communication methods can be used as the wireless communication method as described above, but in the present embodiment, 4G or 5G is assumed as the cellular communication method. Note that the wireless communication method may support a plurality of communication methods. Here, "wireless communication" refers to transmitting and/or receiving signals wirelessly.

When the data transmission device 100 is a smart phone, a mobile phone, a tablet, or the like, the wireless communication unit 101 may perform wireless or wired communication with a wireless communication unit provided on the vehicle, and the wireless communication unit provided on the vehicle may then perform wireless communication with the base station device 4. When wireless communication is used between the wireless communication unit 101 and a wireless communication unit provided on the vehicle, short-range wireless communication such as BLE, Bluetooth (registered trademark) or the like can be used. In such case, the wireless communication unit 101 performs wireless communication with the base station device 4 via the wireless communication unit provided on the vehicle.

The position information acquisition unit 102 acquires position information indicating a current position of the vehicle. The position information acquisition unit 102 is mainly configured with a positioning receiver of a global positioning system (GNSS) device. The positioning receiver may be provided as the one corresponding to a satellite system to be used. The position information acquisition unit 102 includes a positioning receiver as well as a device that supplies correction information used for correcting the position information. For example, an inertial sensor such as a gyro sensor and an acceleration sensor, a laser sensor, and a map information database can also be understood as the position information acquisition unit 102. In the present embodiment, the position information acquisition unit 102 is included in the data transmission device 100, but it may also be provided outside the data transmission device 100. In such case, an interface that receives position information from the outside corresponds to the position information acquisition unit 102.

The speed information acquisition unit 103 is, for example, a vehicle speed sensor, and detects and acquires a moving speed of the vehicle. In the present embodiment, the speed information acquisition unit 103 is included in the data transmission device 100, but it may also be provided outside the data transmission device 100. In such case, an interface that receives the moving speed from the outside corresponds to the speed information acquisition unit 103.

The data storage unit 104 stores "data" transmitted from the wireless communication unit 101. Examples of the data include, but are not limited to, video data captured by an in-vehicle camera, and data related to the operation and situation of the vehicle such as speed, acceleration, the position information and the like. Here, "data" is legitimate as long as it carries some kind of information, and includes programs, commands, etc., in addition to image data, vehicle information, and the like.

The travel route storage unit 105 stores the travel route of the vehicle. A travel route can be represented, for example, by a series of map coordinates on a map. Alternatively, it may be represented by a vector, a straight line, a curved line, or the like.

The radio wave map storage unit 106 stores the acquired radio wave map. The radio wave map is acquired by transmitting a radio wave map request to the radio wave map server device 5 of FIG. 1. Details of the acquisition method are described in association with the propagation environment information acquirer 109, which is described later. In addition, the radio wave map can also be acquired by generating it by itself by obtaining a transmission bit rate using a reference signal antenna provided on a front side of the vehicle traveling direction. In the present embodiment, the radio wave map is used when data is transmitted to the information storage server device 3 via the base station device 4. Thus, the radio wave map to be used may desirably be the radio wave map for uplink.

The data storage unit 104, the travel route storage unit 105, and the radio wave map storage unit 106 may be realized by a volatile memory such as a RAM as well as a non-volatile memory such as a flash memory or a hard disk. Also, a removable storage medium such as a BD, DVD, SD card or the like may be used as those units.

The control unit 107 controls operations of the wireless communication unit 101, the position information acquisition unit 102, the speed information acquisition unit 103, the data storage unit 104, the travel route storage unit 105, and the radio wave map storage unit 106. Also, the control unit 107 implements the travel route information acquirer 108, the propagation environment information acquirer 109, the converter 110, the allocator 111, the transmission instructor 112, and the traffic signal information acquirer 113.

The travel route information acquirer 108 acquires the future travel route of the vehicle. The travel route may be automatically generated by setting a destination in advance on a navigation device. Alternatively, the travel route may be received from an external travel support device. The generated or received travel route is stored in the travel route storage unit 105. Then, the travel route information acquirer 108 acquires the travel route by reading out, from the travel route storage unit 105, a portion of the travel route that is currently being traveled and that will be traveled in the future. Alternatively, the travel route information acquirer 108 acquires all target travel routes by reading them from the travel route storage unit 105 in advance and storing them in the RAM. In addition, for example, in case that the vehicle is an automatic driving vehicle, a request for a travel route may be transmitted to a server (not shown), and the travel route may be downloaded and acquired from the server.

The propagation environment information acquirer 109 "acquires" the "propagation environment information" of the radio wave propagation path on the travel route acquired by the travel route information acquirer 108. The radio wave propagation path is a radio wave propagation path used for wireless communication between the base station device 4 and the wireless communication unit 101. Specifically, a line connecting the position of the vehicle on the travel route and the position of the base station device 4 is formed as the radio wave propagation path. The radio wave map including the acquired propagation environment information is stored in the radio wave map storage unit 106. Here, the "propagation environment information" indicates a state of the radio wave propagation path or an estimation result of the state of such path, which may be represented by using an index, such as RSSI, RSRP, RSRQ, SNR, SIR, BER, a propagation function, a propagation route matrix, an average bit rate per unit time (bit/s), and the like. Further, "obtaining" means any of the cases (i) when the propagation environment information is acquired from an external communication device or the like, (ii) when the propagation environment information is acquired by reading it from the storage device of the data transmission device, and (iii) when the propagation environment information is generated by the data transmission device by itself.

Figure 3:
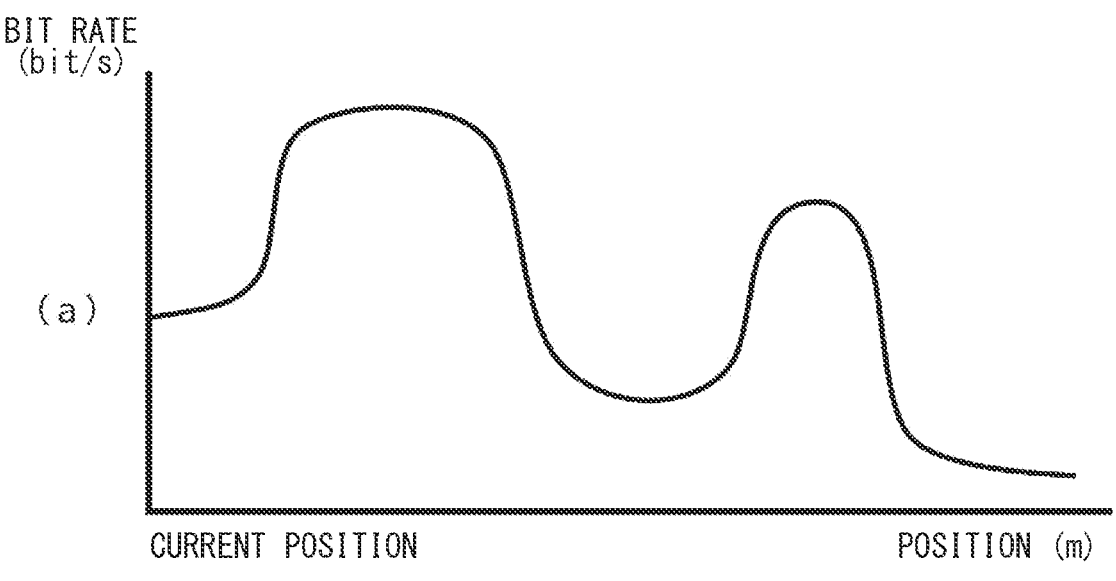
FIG. 3 is an explanatory diagram for explaining an operation of a radio wave environment information acquisition unit and a converter of the data transmission device according to the first and second embodiments of the present disclosure.
Figure 3:
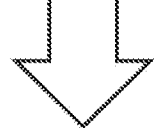
Figure 3:
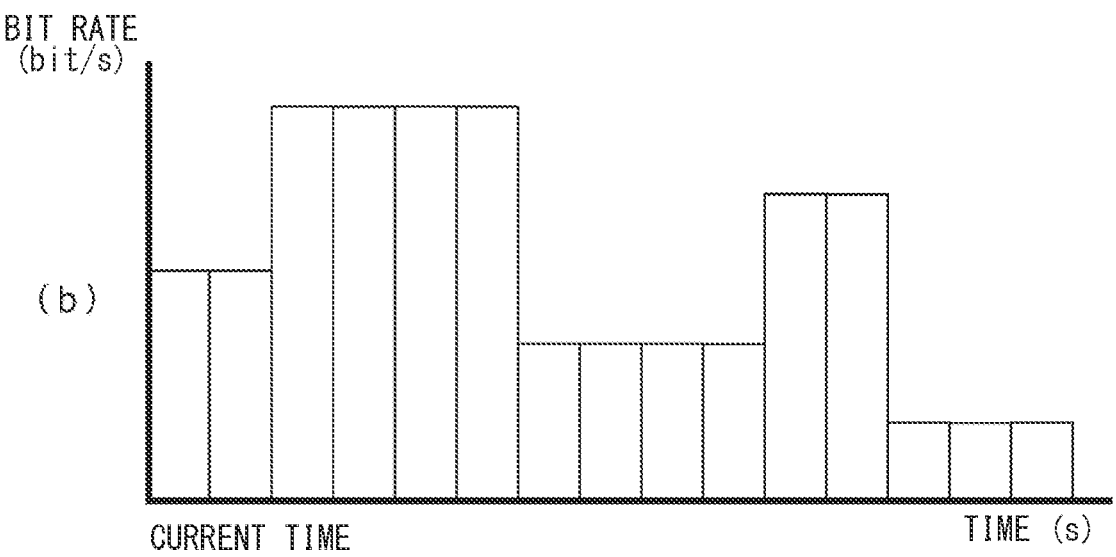

The propagation environment information on the travel route acquired by the propagation environment information acquirer 109 is described with reference to FIG. 3. In FIG. 3 (a), the horizontal axis is the travel route starting from the current position, and the vertical axis is the transmission bit rate as the propagation environment information. The transmission bit rate changes depending on the position on the travel route. For example, the communication environment is good at a position close to the base station device 4, but the communication environment is poor at a position far from the base station device 4 or in a situation where there are obstructions such as buildings or mountains, thereby the transmission bit rate changes according to the communication environment.

The propagation environment information acquirer 109 acquires the transmission bit rate in the travel route by transmitting a radio wave map request to the radio wave map server device 5. The radio wave map request includes requested position information, and the requested position information can be latitude/longitude/altitude (WGS-84) or an ID representing a grid point on the map. In the present embodiment, the requested position information includes a plurality of pieces of position information on the travel route. As the number of pieces of position information increases, a transmission bit rate that changes continuously can be acquired. However, the number of pieces of position information may desirably be the one in accordance with the grade of the positioning accuracy. For example, if the positioning accuracy is 1 to 10 m, then the position information should be sent every 10 m, if it is between 10 cm and 1 m, then every 1 m, and if it is less than 10 cm, then every 10 cm.

Note that a part of the radio wave map, that is, the part corresponding to the travel route, is acquired by the radio wave map request. However, since it is as shown in FIG. 3 (*a*) for indicating a relationship between the propagation environment information and the position information, obtaining the radio wave map is synonymous with obtaining the propagation environment information.

Further, although the transmission bit rate is acquired as the propagation environment information in the present embodiment, other propagation environment information such as the reception strength such as RSSI at the base station device 4 may be used. In such case, the reception strength may be converted into the transmission bit rate, as will be described later.

The transmission bit rate as the propagation environment information may be acquired as two bit rates, i.e., as a first transmission bit rate (corresponding to "first communication speed") and a second transmission bit rate (corresponding to "second communication speed") slower than the first transmission bit rate. The two transmission bit rates can be selectively used by the transmission instructor 112, which will be described later.

In addition, the propagation environment information acquirer 109 may acquire the propagation environment information from the radio wave map storage unit 106 when the radio wave map corresponding to the travel route is already stored in the radio wave map storage unit 106.

The traffic signal information acquirer 113 acquires a remaining time of the stop signal of the traffic signal. As described above, the traffic signal 6 transmits the signal type and the remaining time until the signal type is switched, and the traffic signal information acquirer 113 needs to acquire at least the remaining time of the stop signal among various signal types. The traffic signal information acquirer 113 acquires the remaining time of the stop signal via the wireless communication unit 101 or another communication unit (not shown).

Based on the moving speed acquired by the speed information acquisition unit 103, the converter 110 converts the relationship between the travel route and the propagation environment information into data slots each defined by the corresponding communication speed per unit time. The situation will be specifically described below with reference to FIG. 3.

As already explained, FIG. 3 (*a*) is a radio wave map showing the relationship of the transmission bit rate on the travel route. The converter 110 converts the radio wave map of FIG. 3 (*a*) into the one shown in FIG. 3 (*b*), i.e. converting the horizontal axis from the distance to the time, by using the current moving speed of the vehicle. That is, the distance to each of the positions on the travel route is converted into the arrival time to each of the positions on the travel route. Then, as shown in FIG. 3 (*b*), by introducing a per unit time slot, data slot is defined as a transmission bit rate (corresponding to "communication speed") per unit time. Although the unit time may be any time length, it can be in units of one second, for example. By dividing time into such data slots, the amount of data that can be transmitted per unit time can be acquired.

When the vehicle is stopped, the moving speed is zero, and the distance cannot be converted into time. Therefore, while the vehicle is stopped, assuming that the transmission bit rate at the current position will continue in the future, the radio wave map is converted into data slots.

However, when the vehicle is stopped at a traffic signal, it can be predicted that the vehicle will move with a certain behavior or other in the near future, thereby enabling the converter to convert the map into the data slots based on the predicted moving speed. For example, when the vehicle is stopped according to the stop signal of the traffic signal, the converter 110 performs the conversion, based on an assumption that the moving speed of the vehicle will increase at a constant rate to the speed limit of the travel route after the remaining time acquired by the traffic signal information acquirer 113 has elapsed. For example, if the remaining time is 30 seconds and the speed limit of the travel route is set to 60 km/h, the map is converted to a data slot having a transmission bit rate at the current position until 30 seconds later, and, after 30 seconds and thereafter, conversion to data slots is performable based on an assumption that the speed increases up to 60 km/h with an acceleration of 0.1 G.

Note that, since FIGS. 3 (*a*) and 3 (*b*) both have the vertical axis of the transmission bit rate, conversion of the vertical axis is unnecessary. However, when the propagation environment information acquired by the propagation environment information acquirer 109 is different from the transmission bit rate, a conversion of the vertical axis is also required. For example, when the propagation environment information acquired by the propagation environment information acquirer 109 is the reception strength (RSSI), conversion to the transmission bit rate is performable by using (i) a predetermined table defining the relationship between the reception strength and the transmission bit rate and (ii) various calculations.

The allocator 111 "allocates data" stored in the data storage unit 104 to the data slot(s) in an order from the data slot having the highest transmission bit rate. Here, "to allocate data" means (a) to allocate all of the data when all of the data can be transmitted in one data slot, and (b) to allocate part of the data when all of the data cannot be transmitted in a single data slot. In the latter case, data is allocated across multiple data slots.

Figure 4:
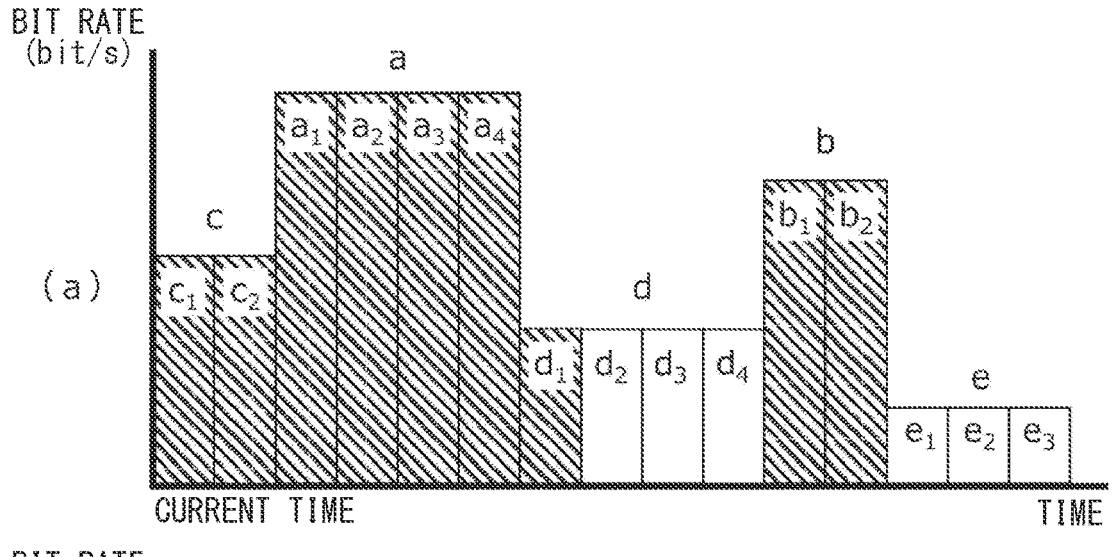
FIG. 4 is an explanatory diagram for explaining the operation of an allocator of the data transmission device according to the first and second embodiments of the present disclosure.
Figure 4:
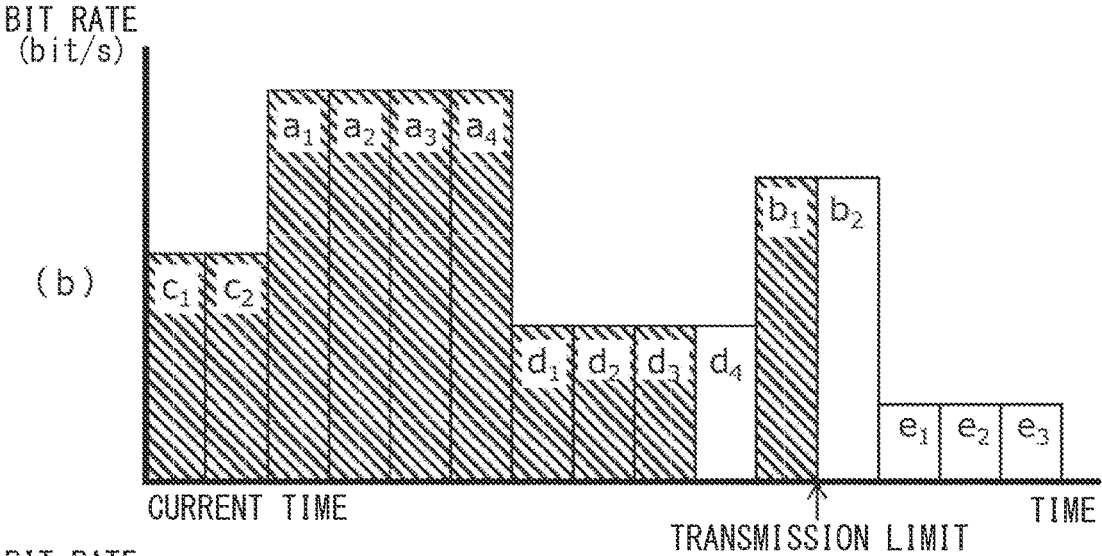
Figure 4:
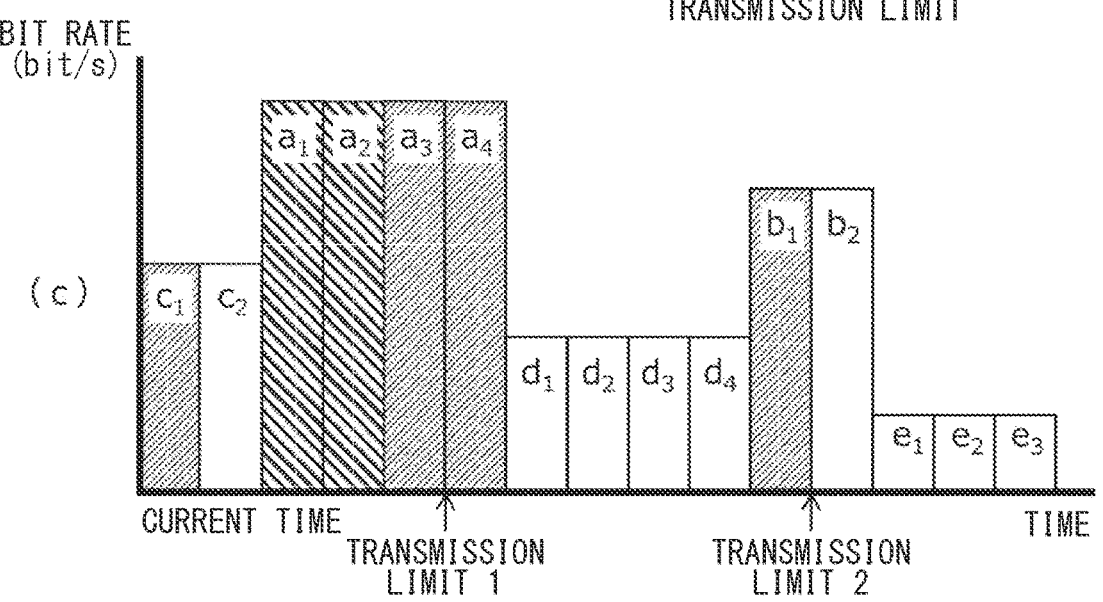

A method of allocating data to data slots will be described with reference to FIG. 4. In FIG. 4 (*a*), the transmission bit rate of each data slot is highest in a, and slows down in the order of b, c, d, and e. Here, consider the case of transmitting data of a predetermined size. When data of a predetermined size are allocated to the data slots in order from the data slots indicated with "a" having the highest bit rate, data are allocated to the data slots in an order of the data slots indicated with a1, a2, a3, a4, b1, b2, c1 and c2, and finally to the data slot indicated with d1, to complete allocation of all the relevant data to the data slots. That is, these data slots are data slots for transmitting data, and the data slots of d2, d3, d4, e1, e2, and e3 to which no data is allocated are data slots for not transmitting data.

Next, with reference to FIG. 4 (*b*), a case of transmitting data with a transmission time limit is described. In FIG. 4 (*b*), a time, which is a "transmission time limit", is set between b1 and b2 and data must be transmitted within the transmission time limit. Therefore, since such data cannot be transmitted after b2, it is necessary to complete data transmission in the data slots by the end of b1. Therefore, in FIG. 4 (*b*), data is allocated to data slots prior to the transmission time limit. In such case, data are allocated to the data slots in the order of a1, a2, a3, a4, b1, c1, c2, d1, d2, and d3. Here, the "transmission time limit" is usable as long as it specifies a final point in time for required data transmission, which may specify a limit in time, or may specify a period of time. Also, the time limit or period may be defined in other formats such as a counter value other than the time and duration.

If there are multiple pieces of data to be transmitted, the data are allocated in order from the data whose transmission time limit is closest to the current time. In FIG. 4 (*c*), consider a case where data 1 has a transmission time limit 1 and data 2 has a transmission time limit 2. It is assumed that transmission time limit 1 is closer to the current time than the transmission time limit 2. Data 1 is allocated to data slots before the transmission time limit 1 in descending order of transmission bit rate. In FIG. 4 (*c*), data 1 is allocated to the data slots of a1 and a2. Data 2 is allocated to the data slots before the transmission time limit 2 and to the data slots to which any data has not yet been allocated, in descending order of transmission bit rate. In FIG. 4 (*c*), data 2 is allocated to the data slots of a3, a4, b1, and c1.

The data transmission time limit can be appropriately set by an application involved in data transmission based on the type of data and the size of data. For example, the data transmission time limit can be determined in consideration of data life time, emergency, an allowable delay and the like, e.g., 10 to 100 ms for data used for real-time control, 1 sec to 1 min for big data and sensing data of other vehicles, 24 hours for data used for map updates and software updates (OTA), and so on.

In such manner, even if the data has a transmission time limit, a communication plan can be made so that the data transmission is complete before the transmission time limit.

In the present embodiment, the data transmission timing is controlled by time rather than the current position of the vehicle. Therefore, when the moving speed of the vehicle changes, there may be a deviation between the transmission bit rate of the initially converted data slot and the transmission bit rate that is actually usable for transmission. Therefore, when the moving speed of the vehicle changes, it is desirable to perform the conversion by the converter 110 and the allocation by the allocator 111 again. Therefore, in the present embodiment, conversion by the converter 110 and allocation by the allocator 111 are performed when a predetermined condition is satisfied.

As one example of the predetermined condition, conversion by the converter 110 and allocation by the allocator 111 are performed when the moving speed changes by a "predetermined value" or more. The predetermined value may be, for example, 1 m/s. Alternatively, it may be a value proportional to the speed or a value proportional to the speed gradient. In such manner, by performing conversion and allocation when the moving speed changes, it is possible to reduce the deviation between the propagation environment information of the radio wave map and the propagation environment when the data is actually transmitted. Here, the "predetermined value" includes not only a constant value but also a value that varies according to predetermined conditions.

As another example of the predetermined condition, conversion by the converter 110 and allocation by the allocator 111 are performed for each unit time of the data slot. In the present embodiment, for example, it may be set to every second. In such case, although it is not linked with changes in the moving speed, since conversion and allocation are performed in a relatively short period, it follows changes in the moving speed as a result. In such manner, by converting and allocating data for each unit time of data slot, it is possible to absorb changes in the moving speed even when the moving speed changes, a deviation of the propagation environment information of the radio wave map from the propagation environment of the actual data transmission can be made smaller.

When data is allocated to the data slot corresponding to the current time, the transmission instructor 112 instructs the wireless communication unit 101 to transmit the data allocated to the data slot. For example, in case of FIG. 4(*a*), data is allocated to the data slot c1 at the current time, thereby instructing the wireless communication unit 101 to transmit the data allocated to the data slot c1.

As described above, the transmission bit rate as the propagation environment information may be chosen and instructed by the transmission instructor 112 from among the two, when two bit rates have been acquired, i.e., the first transmission bit rate (corresponding to the "first communication speed") and the second transmission bit rate slower than the first transmission bit rate (corresponding to the "second communication speed"), according to the type of data, the size of the data, and the like, together with other things. For example, the transmission instructor 112 instructs data transmission at the first communication bit rate when the "priority" of the data is high, and at the second transmission bit rate otherwise. As examples of respective transmission bit rates, the first transmission bit rate can be the expected maximum speed, and the second transmission bit rate can be the recommended speed. In such manner, by selectively using two or more types of transmission bit rate, the base station device 4 can accommodate a large number of transmission terminals. Here, the "priority" may be set arbitrarily as long as it reflects a value evaluation of the data itself, such as importance, urgency and the like.

(2) Operation of the Data Transmission Device 100

Figure 5:
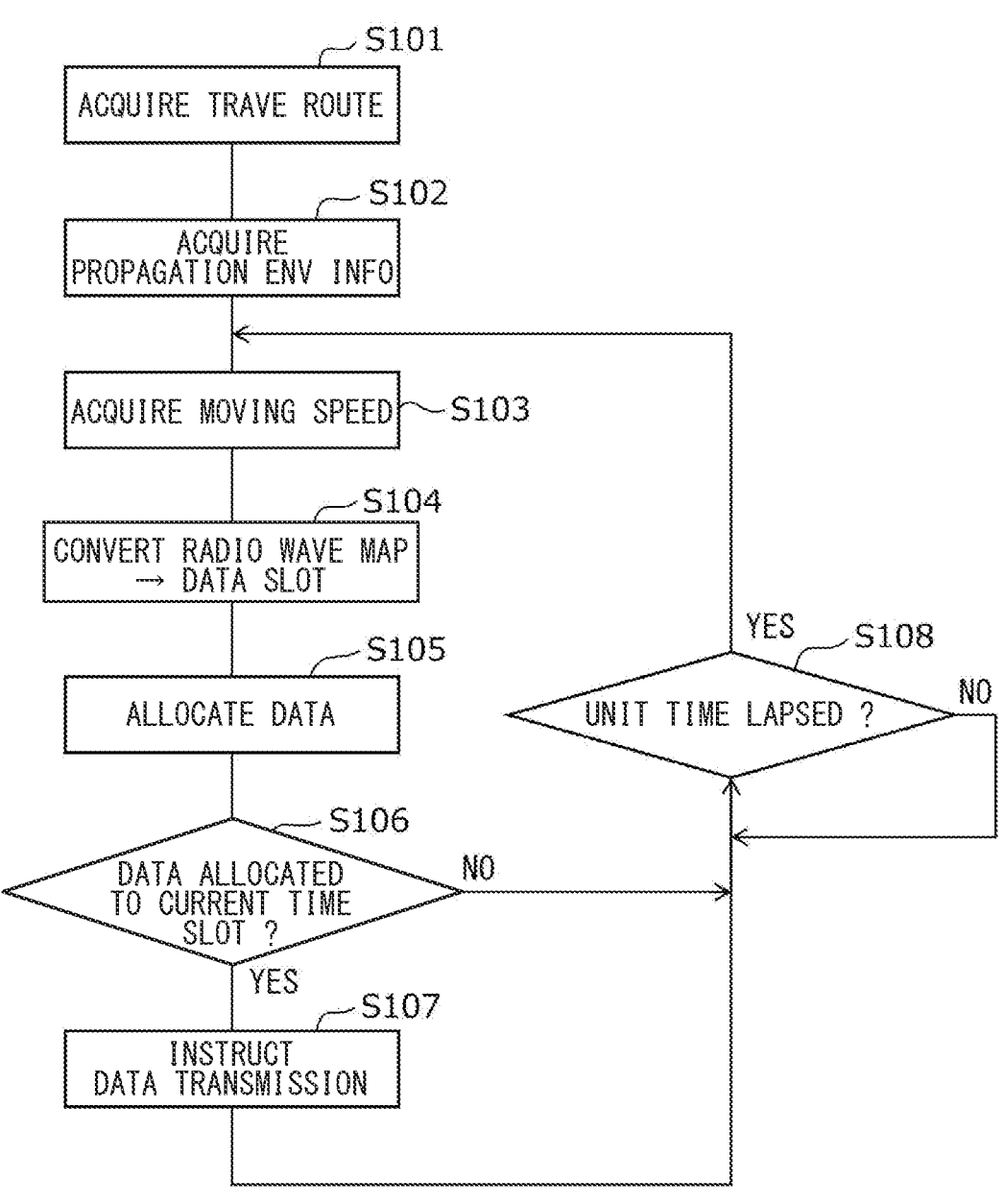
FIG. 5 is a flowchart showing the operation of the data transmission device according to the first embodiment of the present disclosure.

The operation of the data transmission device 100 of the present embodiment is described with reference to the flowchart of FIG. 5. The following operations not only show the data transmission method executed by the data transmission device 100, but also show the processing procedure of the data transmission program that can be executed by the data transmission device 100. These processes are not limited to the order illustrated in FIG. 5. That is, the order may be changed as long as there are no restrictions such as a relationship in which a result of the preceding step is used in a certain step.

The following operation will be described with an example in which conversion by the converter 110 and allocation by the allocator 111 are performed for each unit time. The travel route information acquirer 108 of the data transmission device 100 acquires a future travel route of the vehicle (S101). The propagation environment information acquirer 109 acquires propagation environment information of a radio wave propagation path on the travel route acquired by the travel route information acquirer 108 (S102). The speed information acquisition unit 103 detects and acquires a moving speed of the vehicle (S103). Based on the moving speed acquired by the speed information acquisition unit 103, the converter 110 converts a relationship between the travel route and the propagation environment information into data slots defined by the communication speed per unit time (S104). The allocator 111 allocates data stored in the data storage unit 104 in order from a data slot having the highest communication speed (S105). The transmission instructor 112 determines whether data is allocated to a data slot corresponding to the current time (S106). If data is allocated to the data slot corresponding to the current time (S106: Y), the wireless communication unit 101 is instructed to transmit the data allocated to the data slot (S107). If no data is allocated to the data slot corresponding to the current time (S106: N), the process proceeds to S108. The control unit 107 determines whether or not a unit time has lapsed (S108). If the unit time has lapsed (S108: Y), the process returns to S103.

As described above, according to the data transmission device 100, the data transmission method, and the data transmission program of the present embodiment, since the radio wave map is converted into data slots defined by the communication speed per unit time, data transmission is managed by time (i.e., transmission is complete by time limit). In addition, since the data to be transmitted is allocated in order from a data slot having the highest communication speed, the time required for communication is reducible, thereby improving data transmission efficiency. As a result, an occupancy time of the base station device 4 can be shortened, thereby reducing the load on the base station device 4 and enabling accommodation of a large number of transmission terminals by the base station device 4. Furthermore, a communication plan can appropriately be executed only by the presence or absence of data in the data slot at the current time, and the load on the data transmission device is reducible. Further, by performing conversion and allocation at predetermined timings, data can be transmitted at appropriate timings even if there is a change in vehicle speed.

3. Second Embodiment (1) Configuration of the Data Transmission Device 200

Figure 6:
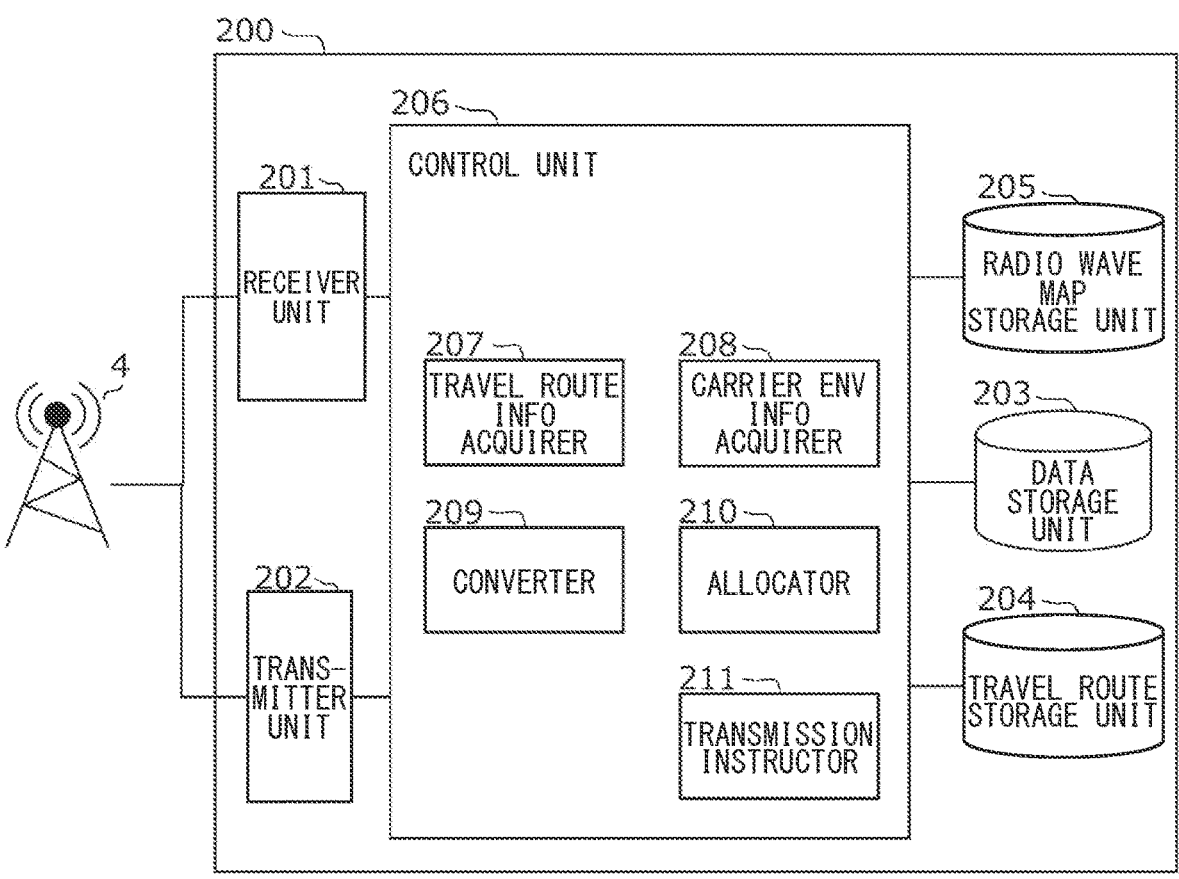
FIG. 6 is a block diagram showing a configuration example of the data transmission device according to the second embodiment of the present disclosure.

The configuration of the data transmission device 200 according to the second embodiment will be described with reference to FIG. 6. In the present embodiment, the information distribution server device 2 in FIG. 1 corresponds to the data transmission device 200. Note that, when the configuration is the same as that of the data transmission device 100 of the first embodiment, the description of such configuration is omitted and the description of the first embodiment is cited as appropriate.

The data transmission device 200 is a device that transmits data to the in-vehicle device 1 mounted on a "moving object". Note that the data transmission device 200 communicates with a transmission device and a reception device, which are the in-vehicle device 1 mounted on a moving object, but for the brevity of explanation, such a situation may be described as communicating with the vehicle.

The data transmission device 200 is composed of a receiver unit 201, a transmitter unit 202, a data storage unit 203, a travel route storage unit 204, a radio wave map storage unit 205 and a control unit 206. Also, the control unit 206 implements a travel route information acquirer 207, a propagation environment information acquirer 208, a converter 209, an allocator 210 and a transmission instructor 211.

The data transmission device 200 can be composed of the following components, i.e., a general-purpose CPU (Central Processing Unit), volatile memory such as RAM, non-volatile memory such as ROM, flash memory, or hard disk, various interfaces, and an internal bus connecting them. Then, by executing software on those hardware, the function of each functional block shown in FIG. 6 can be realized. Of course, the data transmission device 200 may be realized by dedicated hardware such as LSI.

Although the data transmission device 200 is assumed to be a server device as a finished product in the present embodiment, the data transmission device 200 is not limited to such form. That is, for example, the data transmission device 200 may also be in a form of parts, including semiconductor circuits and semiconductor modules, or may also be in a form of semifinished products, including ECUs, or may also be in a form of finished products, including personal computers (PCs), smartphones, mobile phones, and navigation systems. Note that the data transmission device 200 may be composed of a plurality of server devices instead of a single server device.

The receiver unit 201 receives various data from the outside of the data transmission device 200. Specifically, the receiver unit 201 communicates with a vehicle, which is a moving object, and receives a moving speed of the vehicle acquired by the vehicle speed information acquisition unit 103 and the remaining time of the stop signal acquired by the traffic signal information acquirer 113. In FIG. 6, the receiver unit 201 receives data from the vehicle via the base station device 4, which is an external communication device. However, the data may also be received in other path, i.e., without using the base station device 4.

The transmitter unit 202 transmits various data to the outside of the data transmission device 200. Specifically, the transmitter unit 202 transmits data to the base station device 4, which is an external communication device that performs "wireless communication" with the vehicle. An example of the wireless communication method is the same as that described for the wireless communication unit 101.

The data storage unit 203 stores "data" transmitted from the transmitter unit 202. Examples of data are the same as those described for the data storage unit 104.

The travel route storage unit 204 stores a travel route of the vehicle. Examples of the travel route are the same as those described in the travel route storage unit 105. The travel route may be generated by or in the vehicle, received by the receiver unit 201 and stored in the travel route storage unit 204. Alternatively, the information received by the receiver unit 201 from an external driving support device may be saved in the travel route storage unit 204. In order to distinguish the travel routes of a plurality of vehicles, it is desirable to store the data in association with a vehicle ID that identifies the vehicle.

The radio wave map storage unit 205 stores the acquired radio wave map. The radio wave map is acquired by transmitting a radio wave map request to the radio wave map server device 5 of FIG. 1. Details of the acquisition method are the same as those described for the propagation environment information acquirer 109. When the information distribution server device 2 also serves as the radio wave map server device 5, there is no need to transmit the radio wave map request to the outside. In the present embodiment, since the radio wave map is used when data is transmitted to the in-vehicle device 1 via the base station device 4, the radio wave map to be used is preferably the radio wave map for the downlink.

The data storage unit 203, the travel route storage unit 204, and the radio wave map storage unit 205 may be realized by a volatile memory such as a RAM as well as a non-volatile memory such as a flash memory or a hard disk. Also, a removable storage medium such as a BD, DVD, SD card or the like may be used as those units.

The control unit 206 controls operations of the receiver unit 201, the transmitter unit 202, the data storage unit 203, the travel route storage unit 204, and the radio wave map storage unit 205. Also, the control unit 206 implements a travel route information acquirer 207, a propagation environment information acquirer 208, a converter 209, an allocator 210 and a transmission instructor 211.

The travel route information acquirer 207 acquires a future travel route of the vehicle. Specifically, the travel route is acquired by reading a travel route from the travel route storage unit 204. The travel route acquisition method of the travel route information acquirer 207 is the same as that described for the travel route information acquirer 108.

The propagation environment information acquirer 208 "acquires" the "propagation environment information" of the radio wave propagation path on the travel route acquired by the travel route information acquirer 207. The acquisition method of the propagation environment information acquirer 208 for acquiring the propagation environment information and an example of the acquired propagation environment information are the same as those described for the propagation environment information acquirer 109.

Based on the moving speed of the vehicle received by the receiver unit 201, the converter 209 converts the relationship between the travel route and the propagation environment information into data slots defined by the communication speed per unit time. The conversion method of converter 209 is the same as that described for the converter 110.

The allocator 210 allocates the data stored in the data storage unit 203 in order from the data slot having the highest transmission bit rate. The allocation method of the allocator 210 is the same as that described for the allocator 111. Also, the conversion and allocation timings are the same as those described in the first embodiment.

When data is allocated to the data slot corresponding to the current time, the transmission instructor 211 instructs the transmitter unit 202 to transmit the data allocated to the data slot. Contents of the transmission instruction from the transmission instructor 211 are the same as those described for the transmission instructor 112.

(2) Operation of the Data Transmission Device 200

Figure 7:
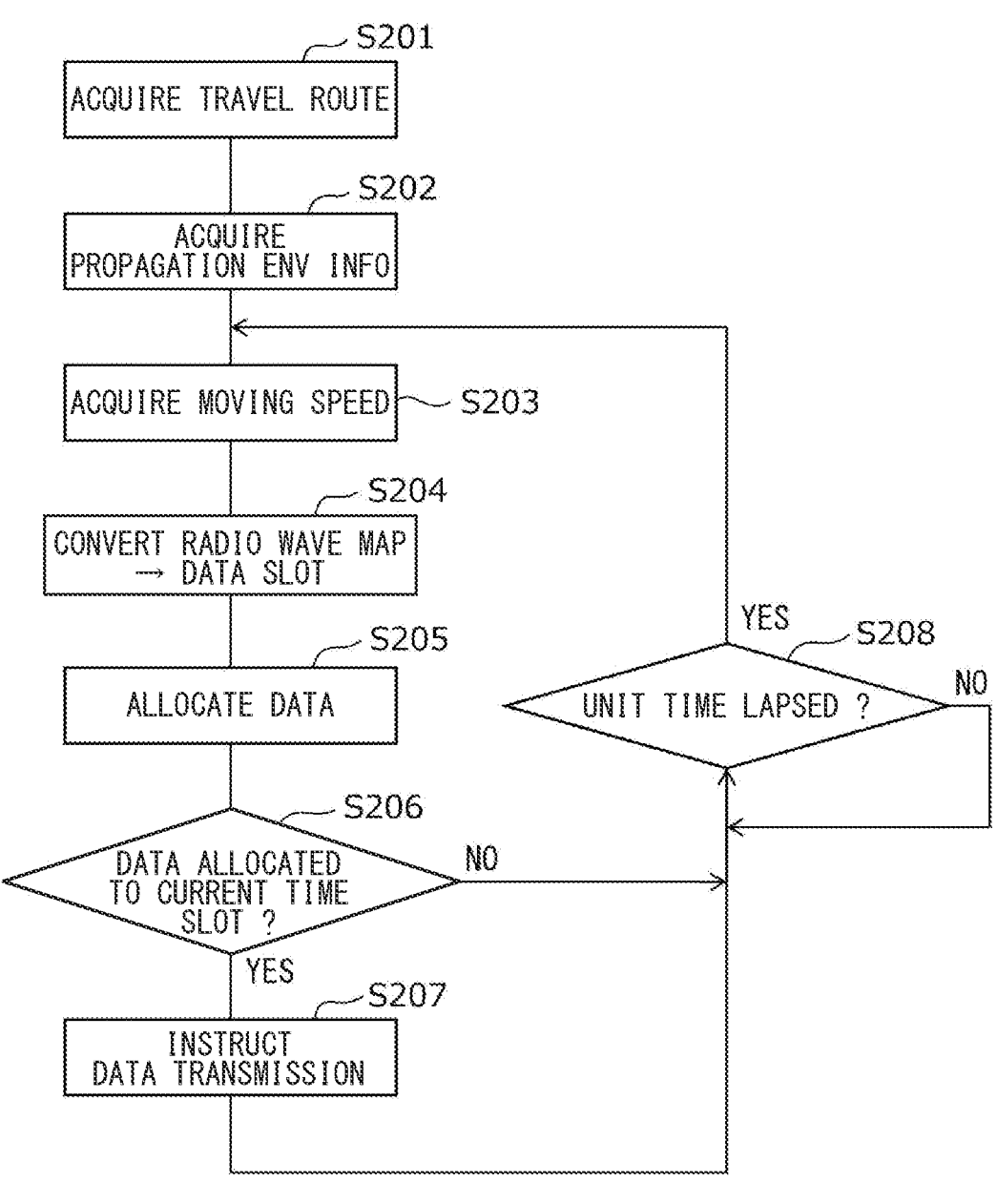
FIG. 7 is a flowchart showing the operation of the data transmission device according to the second embodiment of the present disclosure.

The operation of the data transmission device 200 of the present embodiment is described using the flowchart of FIG. 7. The following operations not only show the data transmission method executed by the data transmission device 200, but also show the processing procedure of the data transmission program that can be executed by the data transmission device 200. These processes are not limited to the order illustrated in FIG. 7. That is, the order may be changed as long as there are no restrictions such as a relationship in which a result of the preceding step is used in a certain step.

The following operation is described as an example in which conversion by the converter 209 and allocation by the allocator 210 are performed for each unit time. The travel route information acquirer 207 of the data transmission device 200 acquires the future travel route of the vehicle (S201). The propagation environment information acquirer 208 acquires the propagation environment information of the radio wave propagation path on the travel route acquired by the travel route information acquirer 207 (S202). The receiver unit 201 receives and acquires the moving speed of the vehicle (S203). Based on the moving speed received by the receiver unit 201, the converter 209 converts the relationship between the travel route and the propagation environment information into data slots defined by the communication speed per unit time (S204). The allocator 210 allocates the data stored in the data storage unit 203 in order from the data slot having the highest communication speed (S205). The transmission instructor 211 determines whether data is allocated to the data slot corresponding to the current time (S206). If data is allocated to the data slot corresponding to the current time (S206: Y), the transmitter unit 202 is instructed to transmit the data allocated to the data slot (S207). If no data is allocated to the data slot corresponding to the current time (S206: N), the process proceeds to S208. The control unit 206 determines whether or not the unit time has lapsed (S208). If the unit time has lapsed (S208: Y), the process returns to S203.

As described above, according to the data transmission device 200, the data transmission method, and the data transmission program of the present embodiment, the radio wave map is converted into data slots defined by the communication speed per unit time, so data transmission is managed by time. can do. In addition, since the data to be transmitted is allocated in order from a data slot having the highest communication speed, the time required for communication is reducible, thereby improving data transmission efficiency. As a result, an occupancy time of the base station device 4 can be shortened, thereby reducing the load on the base station device 4 and enabling accommodation of a large number of transmission terminals by the base station device 4. Furthermore, a communication plan can appropriately be executed only by the presence or absence of data in the data slot at the current time, and the load on the data transmission device is reducible. Further, by performing conversion and allocation at predetermined timings, data can be transmitted at appropriate timings even if there is a change in vehicle speed.

(3) Modification of the Data Transmission Device 200

Although the data transmission device 200 of the second embodiment is realized by the information distribution server device 2, the data transmission device 200 may also be mounted on a vehicle, which is a moving object, and may transmit data to other vehicles.

Figure 8:
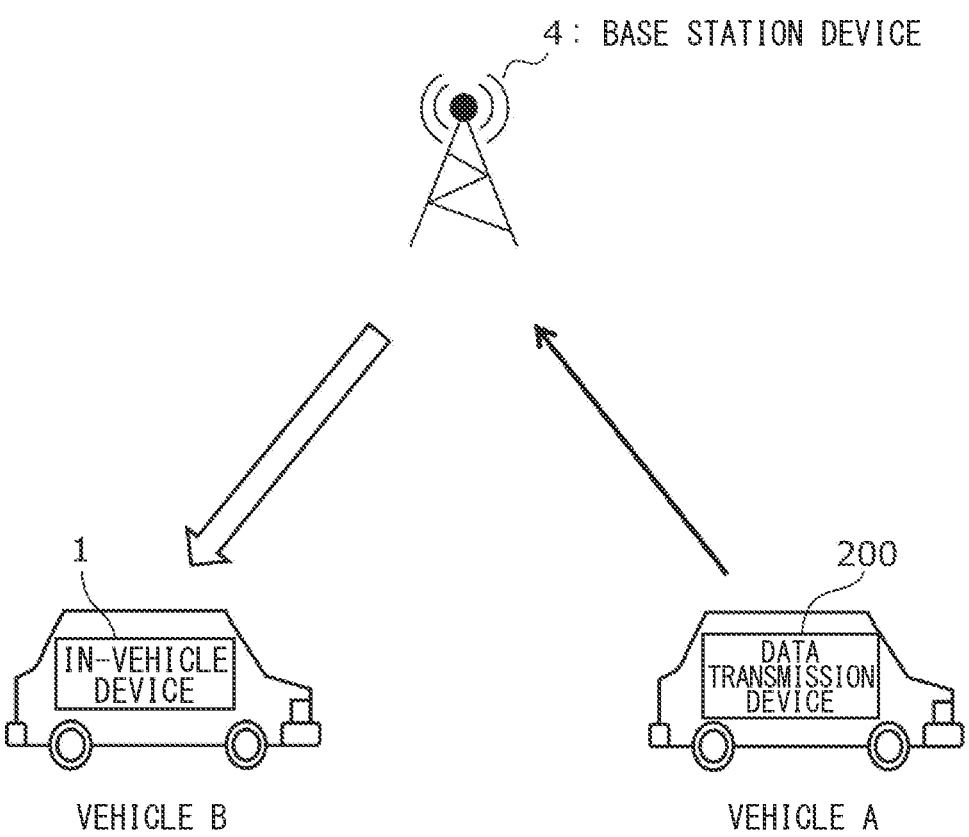
FIG. 8 is a diagram illustrating an overall configuration of a modification of the second embodiment of the present disclosure.

In FIG. 8, a data transmission device 200 mounted on a vehicle A transmits data to a vehicle B, which is another vehicle. Specifically, data is transmitted as follows. The receiver unit 201 of the data transmission device 200 receives the moving speed and the travel route of the vehicle B. Further, the propagation environment information acquirer 208 acquires the propagation environment information by acquiring the downlink radio wave map between the vehicle B and the base station device 4. Then, the transmitter unit 202 transmits the data allocated to the data slots by the converter 209 and the allocator 210 to the base station device 4 based on an instruction of the transmission instructing unit 211. The base station device 4 transmits the data to the in-vehicle device 1 of the vehicle B directly or in a detouring manner through a backbone server.

Note that, although the propagation environment information acquirer 208 acquires the downlink radio wave map between the vehicle B and the base station device 4, the propagation environment information acquirer 208 may also acquire the uplink radio wave map between the vehicle A and the base station device 4. A specific mode of use of the uplink radio wave map is as described in the first embodiment.

4. Other Embodiments

The first and second embodiments are examples of a transmission device that transmits data, but the examples may also be applicable to a data reception device that receives data. The radio wave map used for such modification may be the radio wave map for the downlink when the data reception device is realized on the in-vehicle device 1 shown in FIG. 1, or may be the radio wave map for the uplink when the data reception device is realized on the information distribution server device shown in FIG. 1.

5. Recapitulation

The features of the data transmission device according to each of the embodiments in the present disclosure have been described above.

Since the terms used in each of the embodiments are examples, the terms may be replaced with terms that are synonymous or include synonymous functions.

The block diagram used for the description of the embodiments is acquired by classifying and arranging the configurations of the device for each of the functions. An individual function of the functional blocks may be implemented by (i) hardware (i.e., by using hardware circuitry including digital and/or analog circuits without CPU), or (ii) software (i.e., by using CPU along with memory storing program instructions), or (iii) any combination of the hardware and the software. Further, since the block diagram illustrates the functions, the block diagram can be understood as disclosure of the method and the program that implements the method.

Functional blocks that can be understood as processes, flows, and methods described in the respective embodiments may be changed in order as long as there is no restrictions such as a relationship in which results of preceding other steps are used in one step.

The terms first, second, and N-th (N is an integer) used in each of the embodiments and the claims are used to distinguish two or more configurations of the same type and two or more methods of the same type and do not limit the order and superiority and inferiority.

Each of the embodiments assumes a device mounted on a vehicle, but the present disclosure also includes dedicated or general-purpose devices other than those for vehicles, unless otherwise specified in the claims.

In the above-described embodiments, the device disclosed in each of the embodiments is described based on an assumption that the device is an in-vehicle device mounted on or installed in a vehicle. However, the device may also be carried by a pedestrian.

Further, example forms of the device of the present disclosure include the following. Examples in a form of a component include a semiconductor device, an electronic circuit, a module, and a microcomputer. Examples of a form of a semi-finished product include an electronic control device (ECU) and a system board. Examples in a form of a finished product include a cellular phone, a smartphone, a tablet computer, a personal computer (PC), a workstation, and a server. The devices may include a device having a communication function and the like, and include, for example, a video camera, a still camera, and a car navigation system.

Each device may additionally include necessary functions such as an antenna and a communication interface.

The data transmission device of the present disclosure is assumed to be used for the purpose of providing various services. In other words, the device of the present disclosure is used, the method of the disclosure is used, and/or the program of the present disclosure is executed in the course of providing such services.

The present disclosure is implemented not only by dedicated hardware having a configuration and a function described in relation to each of the embodiments, but the present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program stored in a non-transitory, tangible storage medium (for example, an external storage device (a hard disk, a USB memory, a CD/BD, or the like) of dedicated or general-purpose hardware, or an internal storage device (a RAM, a ROM, or the like)) may also be delivered to dedicated or general-purpose hardware via the recording medium or from a server via a communication line without using the recording medium. In such manner, it is possible to always provide a latest function by updating the program.

Although the data transmission device of the present disclosure has been described as a vehicle device mainly mounted on automobiles, it is also applicable to general moving objects such as pedestrians, ships, aircraft, etc., as well as motorcycles, motorized bicycles, and railways. In addition, it is also applicable to devices used for various purposes, such as mobile phones, tablets, and game machines.

The invention claimed is:

1. A data transmission device mounted in a moving object, comprising:

a wireless communication unit performing wireless communication with an external communication device;

a data storage unit storing data to be transmitted from the wireless communication unit;

a travel route information acquisition unit acquiring a future travel route of the moving object;

a propagation environment information acquisition unit acquiring propagation environment information of a radio wave propagation path used in the wireless communication on the future travel route;

a speed information acquisition unit acquiring a moving speed of the moving object;

a converter converting a relationship between the future travel route and the propagation environment information into a plurality of data slots each defined by a communication speed per unit time based on the moving speed;

an allocation unit allocating the data to at least one of the data slots in an order from a data slot among the at least one of the data slots having a highest communication speed;

a transmission instruction unit instructing the wireless communication unit to transmit the data allocated to a data slot among the at least one of the data slots that corresponds to a current time; and a traffic signal information acquirer that acquires a remaining time of a stop signal of a traffic signal;

wherein:

the plurality of data slots is composed of multiple types of slots having respectively different communication speeds along the future travel route; and when the moving object is stopped according to the stop signal of the traffic signal, the converter performs the converting by assuming that the moving speed of the moving object increases at a constant rate up to a speed limit of the future travel route after elapse of the remaining time.

2. The data transmission device according to claim 1, wherein the converter and the allocation unit perform conversion and allocation at each unit time.

3. The data transmission device according to claim 1, wherein the converter and the allocation unit perform conversion and allocation when the moving speed changes by a predetermined threshold value or more.

4. The data transmission device according to claim 1, wherein a transmission time limit is set for the data, and the allocation unit allocates the data to at least one of the data slots within the transmission time limit.

5. The data transmission device according to claim 4, wherein when the data includes a plurality of data items, the allocation unit allocates one of the data items having the transmission time limit closest to the current time to at least one of the data slots that is earlier than another of the data slots to which another data item is allocated.

6. The data transmission device according to claim 1, wherein the propagation environment information includes a first communication speed and a second communication speed slower than the first communication speed, and the transmission instruction unit instructs transmission of the data at the first communication speed when the data has a high priority and instructs transmission of the data at the second communication speed otherwise.

7. A data transmission method performed by a data transmission device mounted in a moving object and having a wireless communication unit that performs wireless communication with an external communication device, the data transmission method comprising steps of:

acquiring a future travel route of the moving object;

acquiring propagation environment information of a radio wave propagation path used in the wireless communication on the future travel route;

obtaining a moving speed of the moving object;

converting a relationship between the future travel route and the propagation environment information into a plurality of data slots each defined by a communication speed per unit time based on the moving speed;

allocating data to at least one of the data slots in order from a data slot among the at least one of the data slots having a highest communication speed;

instructing the wireless communication unit to transmit the data allocated to a data slot among the at least one of the data slots that corresponds to a current time; and acquiring a remaining time of a stop signal of a traffic signal;

wherein:

the plurality of data slots are composed of multiple types of slots having respectively different communication speeds along the future travel route; and when the moving object is stopped according to the stop signal of the traffic signal, the converting is performed by assuming that the moving speed of the moving object increases at a constant rate up to a speed limit of the future travel route after elapse of the remaining time.

8. A non-transitory, computer readable, tangible storage medium storing a data transmission program executable by a data transmission device mounted in a moving object and having a wireless communication unit that performs wireless communication with an external communication device, the program comprising instructions, when executed by the data transmission device, causing the data transmission device to perform steps of:

acquiring a future travel route of the moving object;

acquiring propagation environment information of a radio wave propagation path used in the wireless communication on the future travel route;

obtaining a moving speed of the moving object;

converting a relationship between the future travel route and the propagation environment information into a plurality of data slots each defined by a communication speed per unit time based on the moving speed;

allocating data to at least one of the data slots in order from a data slot having a highest communication speed;

instructing the wireless communication unit to transmit the data allocated to a data slot among the data slots that corresponds to a current time; and acquiring a remaining time of a stop signal of a traffic signal;

wherein:

the plurality of data slots are composed of multiple types of slots having respectively different communication speeds along the future travel route; and when the moving object is stopped according to the stop signal of the traffic signal, the converting is performed by assuming that the moving speed of the moving object increases at a constant rate up to a speed limit of the future travel route after elapse of the remaining time.

* * * * *